United States Patent
Lawless et al.

(10) Patent No.: US 6,690,567 B1
(45) Date of Patent: Feb. 10, 2004

(54) CAPACITIVE ENERGY STORAGE DEVICE

(75) Inventors: William N. Lawless, Westerville, OH (US); Charles Frederick Clark, Jr., Columbus, OH (US)

(73) Assignee: Ceramphysics, Inc., Westerville, OH (US)

( * ) Notice: Subject to any disclaimer, the term of this patent is extended or adjusted under 35 U.S.C. 154(b) by 0 days.

(21) Appl. No.: 10/255,562

(22) Filed: Sep. 26, 2002

(51) Int. Cl.⁷ .............................. H01G 2/08; H01G 7/00
(52) U.S. Cl. ...................... 361/276; 29/25.42; 501/134; 361/321.4; 361/301.4
(58) Field of Search ................... 361/276, 277, 361/301.2, 301.4, 308.1–308.3, 311–313, 320, 321.1–321.5; 501/134–139; 29/25.42

(56) References Cited

U.S. PATENT DOCUMENTS

| | | | |
|---|---|---|---|
| 3,649,891 A | * | 3/1972 | Lawless ........................ 361/276 |
| 3,814,999 A | * | 6/1974 | Lawless et al. ............. 361/276 |
| 4,231,231 A | | 11/1980 | Lawless |
| 4,296,147 A | | 10/1981 | Lawless |
| 4,296,607 A | | 10/1981 | Lawless |
| 4,296,608 A | | 10/1981 | Lawless |
| 4,354,355 A | | 10/1982 | Lawless |
| 4,356,235 A | | 10/1982 | Lawless |
| 4,396,721 A | | 8/1983 | Lawless |
| 4,462,891 A | | 7/1984 | Lawless |
| 4,515,534 A | | 5/1985 | Lawless et al. |
| 4,545,254 A | * | 10/1985 | Lawless et al. ................ 73/714 |
| 4,547,277 A | | 10/1985 | Lawless |
| 4,599,677 A | * | 7/1986 | Lawless et al. ........... 361/321.2 |
| 4,684,207 A | | 8/1987 | Lawless |
| 4,872,086 A | * | 10/1989 | Huang et al. ................. 505/192 |
| 4,918,421 A | | 4/1990 | Lawless et al. |
| 5,157,581 A | * | 10/1992 | Hashemi .................. 361/321.5 |
| 5,183,965 A | | 2/1993 | Lawless |
| 5,205,990 A | | 4/1993 | Lawless |
| 5,212,013 A | | 5/1993 | Gupta et al. |
| 5,222,713 A | | 6/1993 | Lawless et al. |
| 5,246,729 A | | 9/1993 | Gupta et al. |
| 5,306,700 A | | 4/1994 | Hojaji |
| 5,337,209 A | | 8/1994 | Sutherland et al. |
| 5,343,353 A | | 8/1994 | Miki et al. |
| 5,356,474 A | | 10/1994 | Savkar |
| 5,525,584 A | | 6/1996 | Murakami et al. |
| 5,623,724 A | | 4/1997 | Gurkovich et al. |
| 5,650,376 A | | 7/1997 | Badaye et al. |
| 5,733,832 A | | 3/1998 | Kawamoto et al. |
| 5,926,360 A | * | 7/1999 | Laibowitz et al. ....... 361/321.4 |
| 6,011,981 A | | 1/2000 | Alvarez et al. |
| 6,087,711 A | | 7/2000 | Givens |
| 6,247,224 B1 | | 6/2001 | Li et al. |
| 6,411,491 B2 | | 6/2002 | Lawless et al. |

FOREIGN PATENT DOCUMENTS

| | | |
|---|---|---|
| JP | 63-225525 | 9/1988 |
| JP | 63-261710 | 10/1988 |
| JP | 63-289918 | 11/1988 |
| JP | 64-037092 | 2/1989 |
| JP | 1-09511 | 4/1989 |
| JP | 1-151219 | 6/1989 |
| JP | 1-184814 | 7/1989 |
| JP | 7-187670 | 7/1995 |
| JP | 10120417 | 5/1998 |

* cited by examiner

Primary Examiner—Dean A. Reichard
Assistant Examiner—Eric Thomas
(74) Attorney, Agent, or Firm—Dinsmore & Shohl LLP

(57) ABSTRACT

A capacitive energy storage device is provided with specialized dielectric materials. In accordance with one embodiment of the present invention, a multilayer structure capacitive energy storage device is provided with a plurality of electrode layers and a plurality of dielectric layers. Respective ones of the dielectric layers are interposed between a selected pair of the plurality of electrode layers. The dielectric layers include a combination of materials as follows $$PbMg_xNb_yO_z + SrTiO_3.$$

9 Claims, 4 Drawing Sheets

CAPACITIVE ENERGY STORAGE DEVICE

CROSS REFERENCE TO RELATED APPLICATIONS

This application is related to U.S. patent application Ser. No. 09/559,869, filed Apr. 26, 2000 now abandoned, which is a division of U.S. patent application Ser. No. 09/089,759, filed Jun. 3, 1998, now abandoned which claims the benefit of U.S. Provisional Application Serial No. 60/048,688, CAPACITIVE ENERGY STORAGE AT 77K, filed Jun. 5, 1997. This application is also related to U.S. patent application Ser. No. 09/916,863, filed Jul. 27, 2001 now U.S. Pat. No. 6,411,491, which is also a continuation-in-part of U.S. patent application Ser. No. 09/559,869, filed Apr. 26, 2000 now abandoned.

BACKGROUND OF THE INVENTION

The present invention relates to capacitive energy storage devices. The storage devices of the present invention may be used at cryogenic temperatures.

Storing energy in banks of capacitors at room temperature is commonly used in applications where size or weight has not been a major concern. Such capacitor technology is quite advanced. However, where the size and weight of the capacitive energy storage devices are of significance and are desired to be minimized, and where rapid discharge is desired, there are potential benefits to be obtained by improvements in capacitive energy storage device structure.

In capacitive energy storage devices, the Helmholtz free energy density of the dielectric is an important quantity. The larger the Helmholtz free energy density of the dielectric, the greater the energy per unit volume which can be stored. The Helmholtz free energy density is defined by the following equation:

$$\Delta F = \frac{1}{8\Pi} \int_0^{E_c^2} \varepsilon dE^2 (cgs),$$

where F is the Helmholtz free energy density, $\varepsilon$ is the dielectric constant of the material, E is the electric field strength, and Ec is the upper limit of electric field strength.

Some studies of capacitive energy storage at cryogenic temperatures have been published. One study dealt with the impregnation of dielectric films with liquid nitrogen or polar liquids. K. N. Mathes and S. H. Minnich, "Cryogenic Capacitor Investigation," Final Report, S-67-1095, May 1965. Three types of materials were investigated at 77 K, and it was concluded that energy densities of approximately 0.6 J/cm$^3$ were possible. Energy density may be defined as the energy per unit volume of a medium.

The use of strontium titanate glass ceramic materials as capacitive energy storage devices at cryogenic temperatures was reported by Lawless, Proc. XIII Int'l. Congress of Refrigeration, Washington, D.C., 1971, Vol. 1, p. 599. Based on measurements of electric field strength and dielectric breakdown at 77 K, it was predicted that energy densities of approximately 5.0 J/cm$^3$ were possible.

However, there is a need in the art for materials which can be used as capacitive energy storage devices and which have even greater energy densities. The size and weight of capacitive energy storage devices could be reduced, providing portability to devices which have been heretofore too large and bulky to be mobile. For example, high powered lasers require massive capacitor banks which are too large and heavy to be moved easily. Capacitive devices having large energy densities could reduce the necessary bulk of the capacitors presently utilized in such applications.

U.S. Pat. No. 4,599,677, CAPACITIVE ENERGY STORAGE DEVICE FOR USE AT CRYOGENIC TEMPERATURES, issued Jul. 8,1986, the disclosure of which is incorporated herein by reference, teaches a capacitive energy storage device utilizing ceramic materials found to possess large dielectric constants at temperatures in the range of about 50 K to 90 K.

However, even in view of the significant advances introduced by the capacitive energy storage devices described in U.S. Pat. No. 4,599,677, there exists a continuing demand for energy storage devices having improved operating characteristics.

SUMMARY OF THE INVENTION

This demand is met by the present invention wherein a capacitive energy storage device is provided comprising specialized dielectric materials.

In accordance with one embodiment of the present invention, a multilayer structure capacitive energy storage device is provided comprising a plurality of electrode layers and a plurality of dielectric layers. Respective ones of the dielectric layers are interposed between a selected pair of the plurality of electrode layers. The dielectric layers comprise a combination of materials as follows

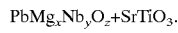

$PbMg_xNb_yO_z + SrTiO_3$.

Accordingly, it is an object of the present invention to provide an improved capacitive energy storage device having improved operational characteristics through proper selection of a material for forming the dielectric layers of the device. Other objects of the present invention will be apparent in light of the description of the invention embodied herein.

BRIEF DESCRIPTION OF THE DRAWINGS

The following detailed description of the preferred embodiments of the present invention can be best understood when read in conjunction with the following drawings.

DETAILED DESCRIPTION OF THE PREFERRED EMBODIMENTS

Figure 1:
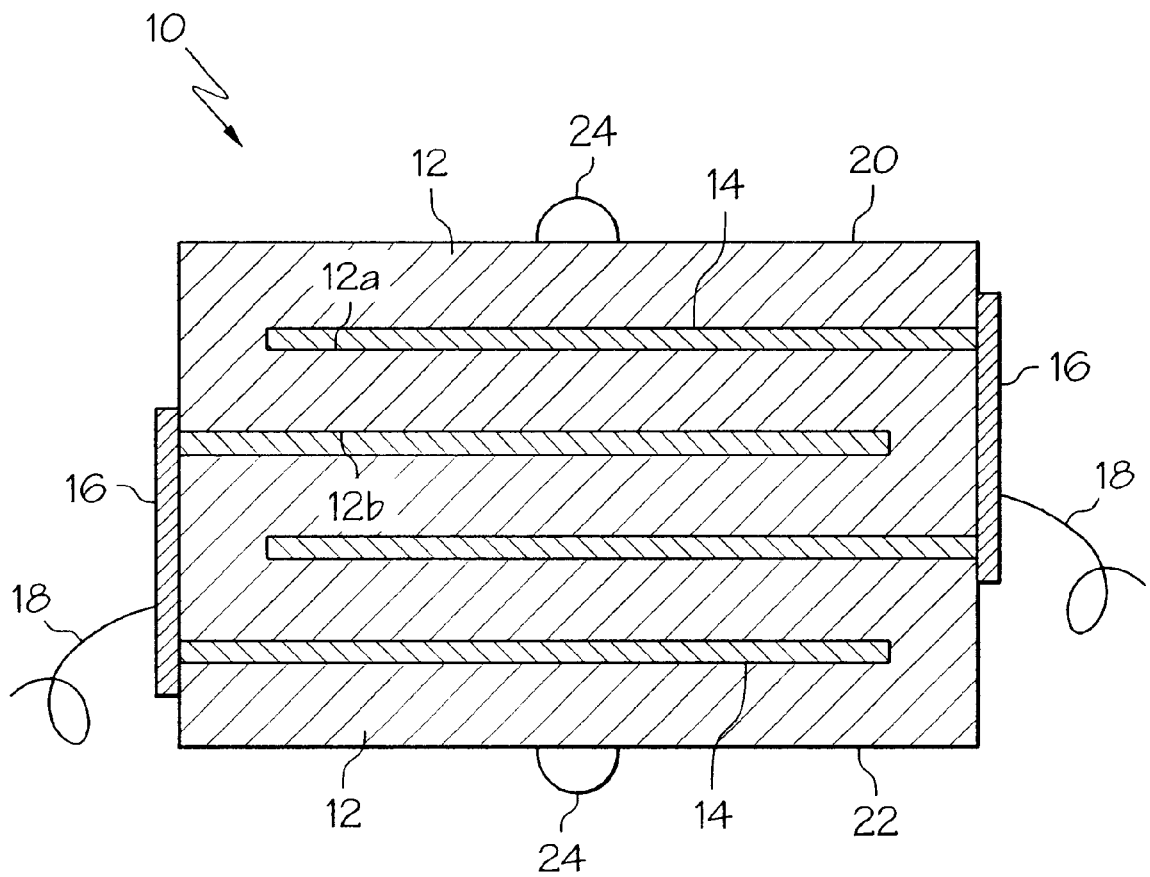
FIG. 1 is a schematic diagram of a typical capacitor structure which may be used in the practice of the present invention.

A capacitive energy storage device 10 according to one embodiment of the present invention is illustrated in FIG. 1. The storage device 10 incorporates a multilayer structure comprising dielectric layers 12 with interleaved electrode layers 14. Electrically conductive caps 16 make electrical contact to the electrode layers 14 and to power lines 18. Upon electrical discharge, the energy stored in the ceramic layers 1 is released to the power lines 18 via the electrode layers 14 and conductive caps 16 as a large electromagnetic current pulse. While the device illustrated in FIG. 1 is shown with only a few layers for simplicity and ease of understanding, it will be apparent to those skilled in the art that many more layers may be built up in accordance with these teachings to form more complex multilayered capacitive energy storage devices.

The Helmholtz free energy equation, Equation 1 above, indicates that in order to optimize F, the free energy density, both the upper limit of electric field strength, Ec, and the dielectric constant of a material $\epsilon$, should be as large as possible. Lowering the temperature of a dielectric material will permit increases in the upper limit of electric field strength, Ec. Thus, operation at cryogenic temperatures in the range of about 60 K to about 150 K will permit larger Ec values. A preferred temperature of operation of the device of the present invention is at or near 77 K, the temperature of liquid nitrogen. Liquid nitrogen is inexpensive, readily available, and has a large specific heat in comparison with liquid helium. Of course, operation at other cryogenic temperatures is possible by utilizing materials such as liquid helium or by utilizing improved cryogenic refrigeration devices. For the purposes of describing and defining the present invention, cryogenic temperatures are utilized herein to refer to any temperature, below room temperature, at which the charge storage device exhibits improved operational characteristics. Specifically, the dielectric material may be selected such that it comprises a combination of materials as follows:

$$PbMg_xNb_yO_z + SrTiO_3$$

where x is about 0.33, y is about 0.67, and z is about 3, and where $SrTiO_3$ comprises about 20 to about 45 mol percent of the combination and, more specifically about 42 to about 44 mol percent of the combination.

Figure 2:
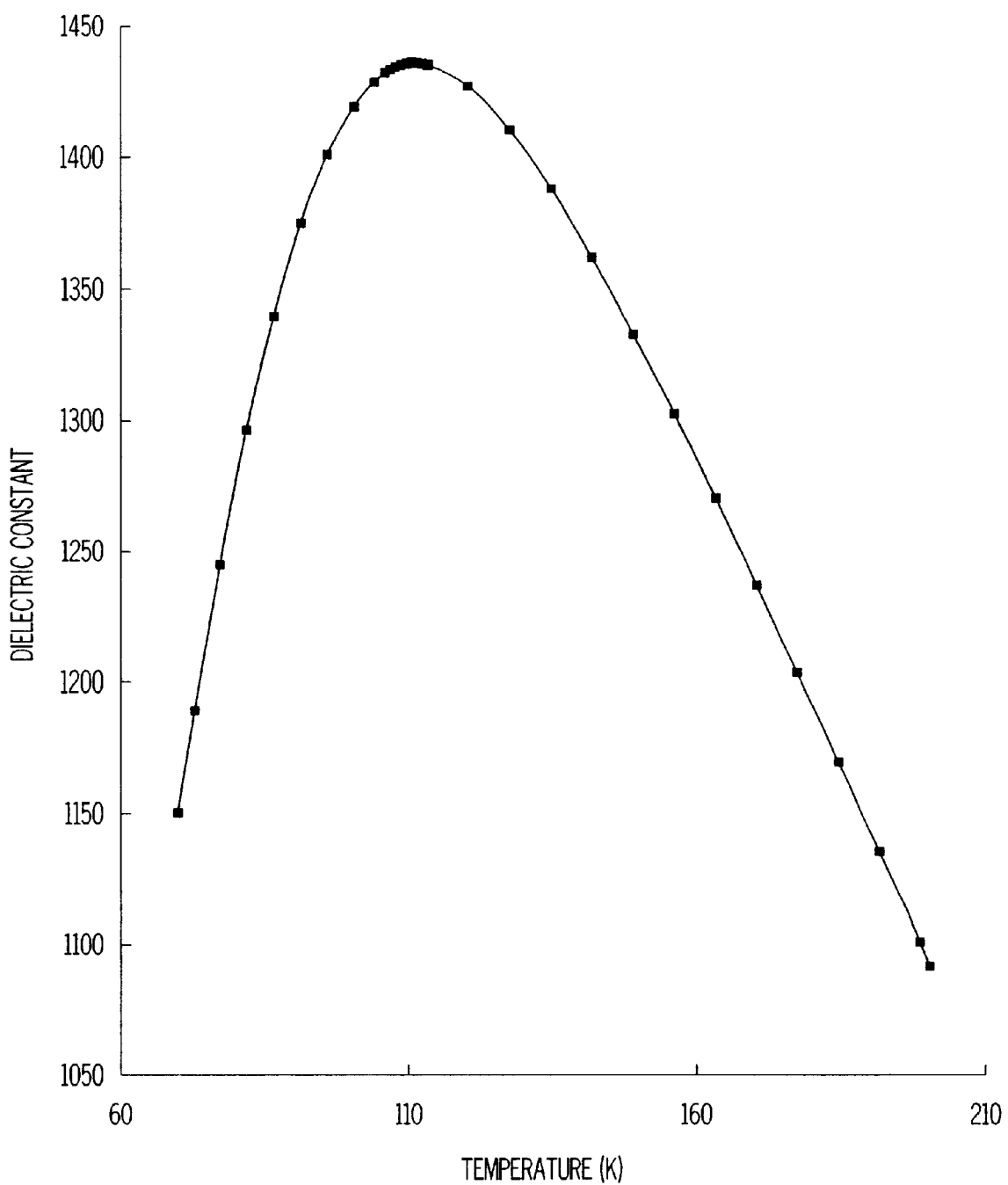
FIG. 2 illustrates the dependence of dielectric constant on temperature for a dielectric material according to the present invention.
Figure 3:
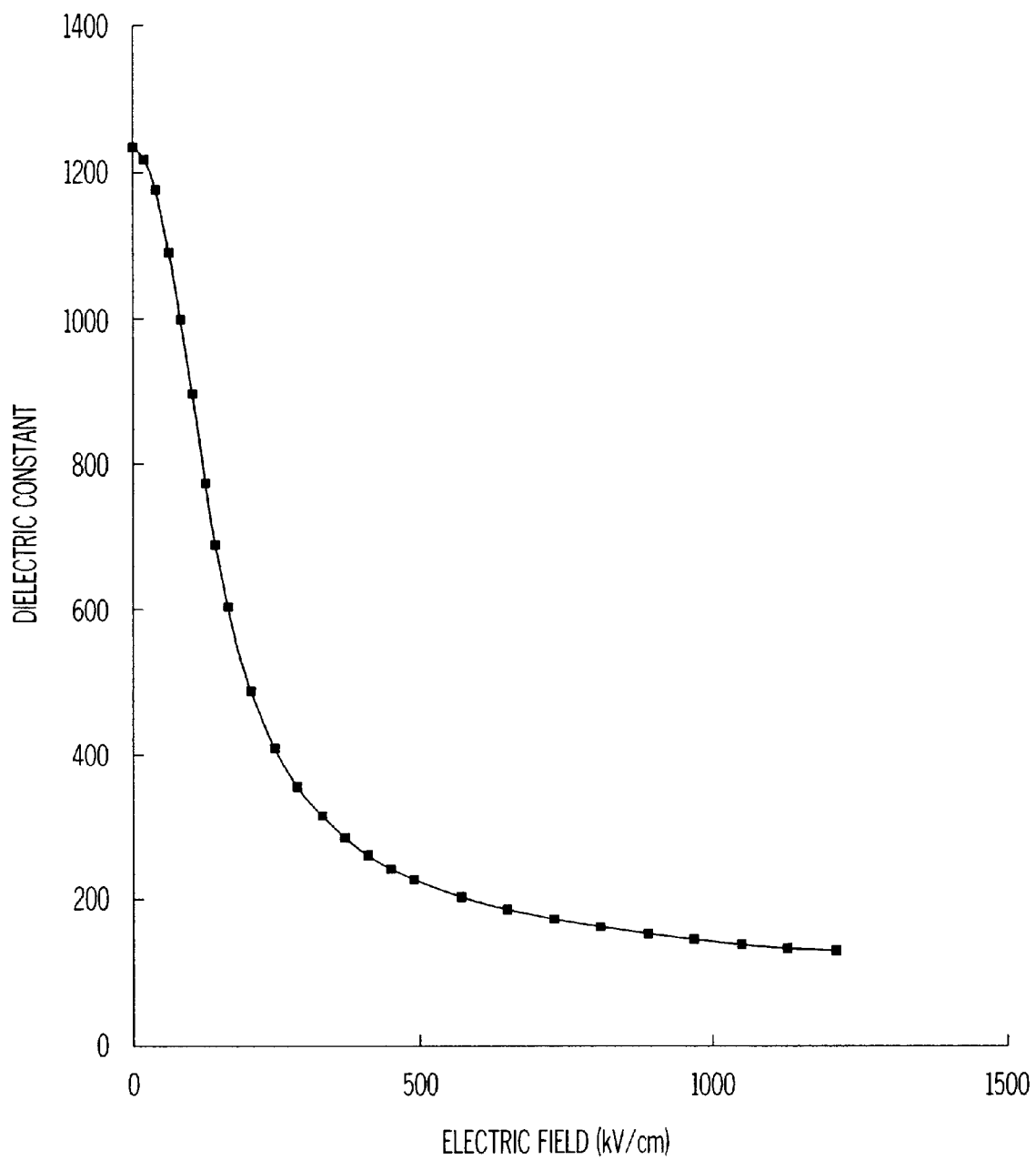
FIG. 3 illustrates the dependence of dielectric constant on electric field strength for a dielectric material according to the present invention.
Figure 4:
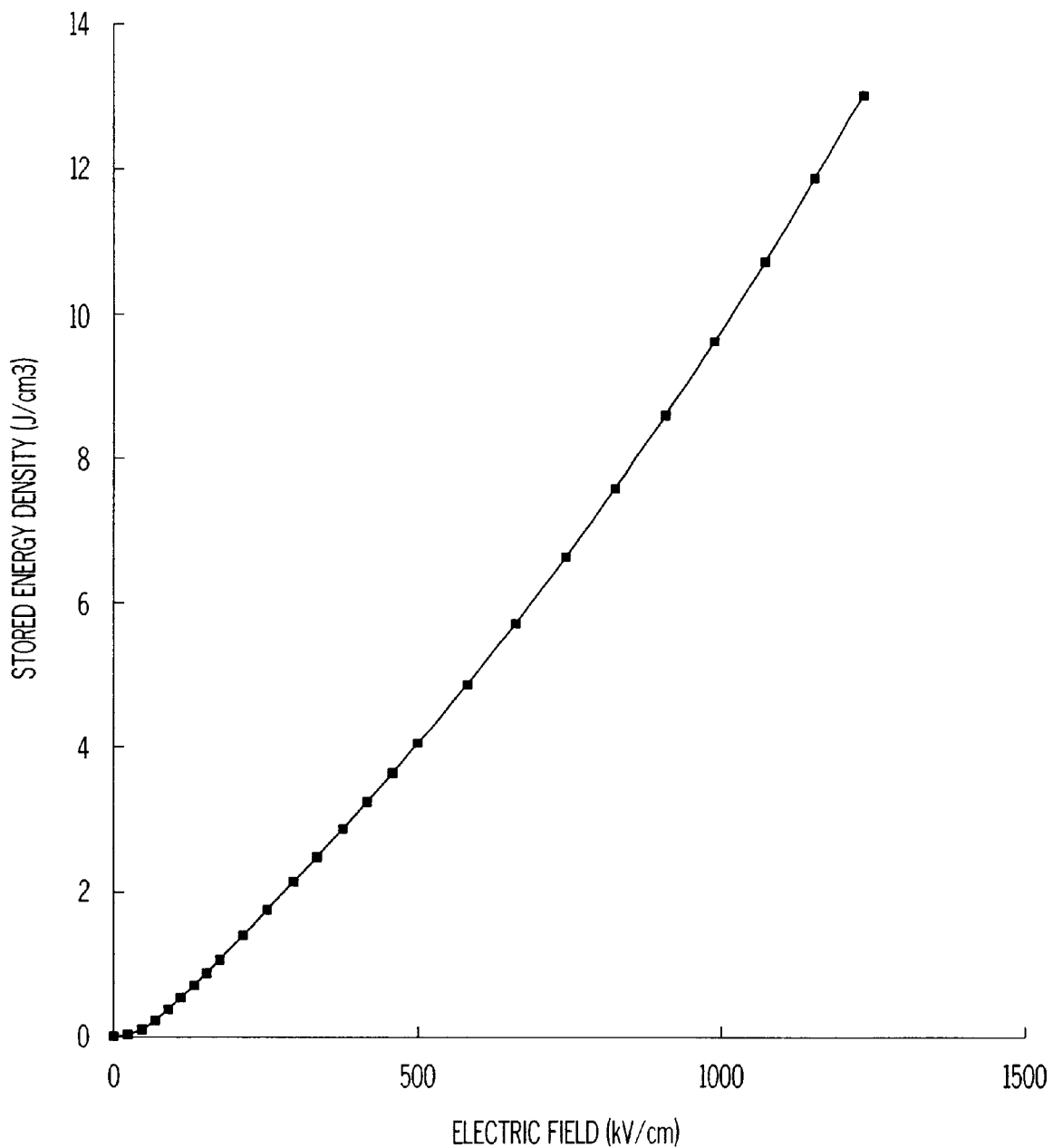
FIG. 4 illustrates stored energy density as a function of electric field for a dielectric material according to the present invention.

FIGS. 2–4 illustrate that the above-noted material, where $SrTiO_3$ comprises about 44 mol percent of the composition, is well-suited for use as a dielectric. Specifically, FIG. 2 illustrates the dependence of the dielectric constant of the above-noted dielectric material on temperature. The data illustrate significant dielectric constant values at cryogenic temperatures. FIG. 3 illustrates the dependence of dielectric constant on electric field strength for the same composition, at 77 K. The data of FIG. 3 illustrate significant dielectric constant values at low electric field strengths. Finally, FIG. 4 illustrates stored energy density as a function of electric field for the same composition, at 77 K. The data of FIG. 4 illustrate a significantly uniform, predictable increase in stored energy density with an increasing electric field strength.

Alternatively, the dielectric material may be selected such that it has a formula selected from the following group: $(Cd_{1-x}Pb_x)_2(Nb_{1-y}Ta_y)_2O_7$, where x and y are values between about 0 and about 1, $(Sr_{1-a}Ba_a)TiO_3$, where a is a value between about 0 and about 0.5, $(Pb_{1-b}Ni_b)_3MgNb_2O_9$, where b is a value between about 0 and about 1, and combinations thereof.

The electrode layers 14 comprise an electrically conductive material. It is contemplated that any of a variety of conductive materials suitable for use in capacative energy storage devices. For example, suitable conductors include Pt, Pd, Ag, Au and combinations thereof.

Referring further to FIG. 1, the capacitive energy storage device 10 of the present invention further comprises additional layers of dielectric material 12 positioned to define respective exterior major faces 20, 22 of the storage device 10. Thermally conductive heat dissipation pads 24 are bonded to respective ones of the exterior major faces 20, 22 to improve heat transfer from the storage device 10 to the associated surrounding cooling medium, e.g., liquid nitrogen. Preferably, the thermally conductive heat dissipation pad comprises a dot of silver. It is contemplated by the present invention that the shape and dimensions of the pads 24 may vary according to the cost considerations and design preferences of those practicing the present invention.

A capacitive energy storage device according to the present invention may be produced by providing a layer of dielectric material 12 having a pair of opposite substantially parallel major faces 12a, 12b. First and second electrode layers 14 are provided on the major faces, and the structure comprising the dielectric layer 12 and the electrode layers 14 are co-fired for a duration and at a temperature sufficient to sinter the material of the dielectric layer 12. Typically, the temperature is between about 950° C. and 1100° C. and the duration is approximately 2 hours. However, it is noted that the duration and temperature vary depending upon the size of the discrete particles forming the dielectric layer 12. Preferably, the electrode layers 14 are provided in the form of an electrode layer material slurry.

Having described the invention in detail and by reference to preferred embodiments thereof, it will be apparent that modifications and variations are possible without departing from the scope of the invention defined in the appended claims.

What is claimed is:

1. A method of capactively storing energy at cryogenic temperatures, comprising:
   providing at least one capacitive energy storage device, wherein:
     said at least one capacitive energy storage device comprises a plurality of electrode layers and a plurality of dielectric layers;
     respective ones of said dielectric layers are interposed between a selected pair of said plurality of electrode layers;
     said dielectric layers comprise a combination of materials as follows $$PbMg_xNb_yO_z + SrTiO_3;$$

said plurality of electrode layers are formed from an electrically conductive material;
   maintaining said at least one capacitive energy storage device at a cryogenic temperature between about 60 to about 150 K; and
   applying an electric field to said at least one capacitive energy storage device such that said capacitive energy storage device stores electrical energy.

2. The method as claimed in claim 1 wherein said at least one capacitive energy storage device is maintained at a cryogenic temperature of about 77 K.

3. The method as claimed in claim 1 wherein said $SrTiO_3$ comprises about 20 to about 45 mol percent of said combination of materials.

4. The method as claimed in claim 1 wherein said $SrTiO_3$ comprises about 42 to about 44 mol percent of said combination of materials.

5. The method as claimed in claim 1 wherein said dielectric material exhibits an improved dielectric constant at said cryogenic temperature relative to a dielectric constant of said dielectric material at room temperature.

6. The method as claimed in claim 1 wherein said at least one capacitive energy storage device further comprises:
   additional layers of dielectric material positioned to define respective exterior major faces of said storage device; and a thermally conductive heat dissipation pad bonded to at least one of said exterior major faces.

7. The method as claimed in claim 6 wherein said thermally conductive heat dissipation pad comprises a silver dot.

8. The method as claimed in claim 1 wherein said electrically conductive material of said electrode layers comprises a material selected from Pt, Pd, Ag, Au, and combinations thereof.

9. A method of capactively storing energy at cryogenic temperatures, comprising:

provicing at least one capacitive energy storage device, wherein:

said at least one capacitive energy storage device comprises a plurality of electrode layers and a plurality of dielectric layers;

respective ones of said dielectric layers are interposed between a selected pair of said plurality of electrode layers;

said dielectric layers comprise a combination of materials as follows $$PbMg_xNb_yO_z + SrTiO_3;$$

said $SrTiO_3$ comprises about 42 to about 44 mol percent of said combination of materials; and said plurality of electrode layers are formed from an electrically conductive material;

maintaining said at least one capacitive energy storage device at a cryogenic temperature of about 77 K; and applying an electric field to said at least one capacitive energy storage device such that said capacitive energy storage device stores electrical energy.

* * * * *